US008390826B2

(12) United States Patent
Walstra (10) Patent No.: US 8,390,826 B2
(45) Date of Patent: Mar. 5, 2013

(54) METHOD AND SYSTEM FOR OPTICALLY INSPECTING PARTS

(75) Inventor: Eric M. Walstra, Waterford, MI (US)

(73) Assignee: GII Acquisition, LLC, Davisburg, MI (US)

( * ) Notice: Subject to any disclaimer, the term of this patent is extended or adjusted under 35 U.S.C. 154(b) by 135 days.

(21) Appl. No.: 13/090,314

(22) Filed: Apr. 20, 2011

(65) Prior Publication Data

US 2012/0268748 A1    Oct. 25, 2012

(51) Int. Cl.
*G01B 11/14* (2006.01)
*G01B 11/08* (2006.01)

(52) U.S. Cl. ......... 356/625; 356/638; 356/639; 356/640

(58) Field of Classification Search ........... 356/614–640
See application file for complete search history.

(56) References Cited

U.S. PATENT DOCUMENTS

| 3,924,953 | A |   | 12/1975 | Allard |
|---|---|---|---|---|
| 4,315,688 | A |   | 2/1982 | Pryor |
| 4,547,674 | A |   | 10/1985 | Pryor et al. |
| 4,598,998 | A |   | 7/1986 | Kamei et al. |
| 4,644,394 | A |   | 2/1987 | Reeves |
| 4,721,388 | A |   | 1/1988 | Takagi et al. |
| 4,831,251 | A |   | 5/1989 | Hanna |
| 4,852,983 | A |   | 8/1989 | Fein |
| 4,906,098 | A |   | 3/1990 | Thomas et al. |
| 4,918,825 | A |   | 4/1990 | Lesh et al. |
| 4,923,066 | A |   | 5/1990 | Ophir et al. |
| 4,969,746 | A |   | 11/1990 | McConnell et al. |
| 4,970,401 | A |   | 11/1990 | Sadeh et al. |
| 4,983,043 | A |   | 1/1991 | Harding |
| 5,012,117 | A |   | 4/1991 | Karafa et al. |
| 5,164,995 | A |   | 11/1992 | Brooks et al. |
| 5,168,458 | A |   | 12/1992 | Gomes |
| 5,170,306 | A |   | 12/1992 | Gomes |
| 5,291,272 | A |   | 3/1994 | Demirsu |
| 5,383,021 | A | * | 1/1995 | Hanna ........................... 356/634 |
| 5,521,707 | A |   | 5/1996 | Castore et al. |
| 5,568,263 | A |   | 10/1996 | Hanna |
| 5,570,513 | A |   | 11/1996 | Peterson |
| 5,608,530 | A |   | 3/1997 | Gates |
| 5,646,724 | A |   | 7/1997 | Hershline |
| 5,986,745 | A | * | 11/1999 | Hermary et al. ............. 356/3.03 |
| 6,055,329 | A |   | 4/2000 | Mufti |
| 6,252,661 | B1 |   | 6/2001 | Hanna |
| 6,285,034 | B1 |   | 9/2001 | Hanna et al. |

(Continued)

FOREIGN PATENT DOCUMENTS

| WO | 2005022076 A2 | 3/2005 |
|---|---|---|
| WO | 2009130062 A1 | 10/2009 |

*Primary Examiner* — Michael P Stafira
(74) *Attorney, Agent, or Firm* — Brooks Kushman P.C.

(57) ABSTRACT

A method and apparatus that linearly scans at least one plane of radiation having a width wider than the diameter of the part onto an exterior side surface of the supported part so that the part occludes the at least one plane of radiation at a plurality of spaced apart locations. The invention includes forming a virtual representation of an outer profile of the part in a reference frame based on the input data and providing a virtual representation of an inner bore of a physical gauge in the reference frame. Then determining an interference position between the part and the gauge using the virtual representations wherein the interference position is a position along the axis where the bore diameter is substantially equal to the part diameter. Finally calculating a distance along the axis based on the interference position and storing the distance.

22 Claims, 5 Drawing Sheets

U.S. PATENT DOCUMENTS

| | | |
|---|---|---|
| 6,289,600 B1 | 9/2001 | Watts |
| 6,313,948 B1 | 11/2001 | Hanna |
| 6,397,720 B1 | 6/2002 | Fox et al. |
| 6,708,071 B1 | 3/2004 | Turner |
| 6,959,108 B1 | 10/2005 | Bartelt et al. |
| 7,312,607 B2 | 12/2007 | Nygaard |
| 7,403,872 B1 * | 7/2008 | St. Onge et al. .............. 702/185 |
| 7,565,216 B2 | 7/2009 | Soucy |
| 7,633,046 B2 * | 12/2009 | Spalding ....................... 250/221 |
| 7,633,634 B2 * | 12/2009 | Spalding et al. .............. 356/635 |
| 7,633,635 B2 * | 12/2009 | Nygaard et al. .............. 356/638 |
| 7,684,054 B2 * | 3/2010 | Crowther ..................... 356/607 |
| 7,738,088 B2 | 6/2010 | Spalding |
| 7,738,121 B2 | 6/2010 | Spalding |
| 7,755,754 B2 | 7/2010 | Spalding |
| 7,777,900 B2 | 8/2010 | Nygaard et al. |
| 7,796,278 B2 | 9/2010 | Spalding et al. |
| 7,812,970 B2 | 10/2010 | Nygaard |
| 2005/0174567 A1 | 8/2005 | Hanna |
| 2006/0236792 A1 | 10/2006 | Hanna |
| 2006/0248739 A1 | 11/2006 | Cauley |
| 2010/0201806 A1 | 8/2010 | Nygaard et al. |
| 2010/0245850 A1 | 9/2010 | Lee et al. |
| 2011/0043803 A1 * | 2/2011 | Nygaard et al. .............. 356/399 |

* cited by examiner

METHOD AND SYSTEM FOR OPTICALLY INSPECTING PARTS

TECHNICAL FIELD

This invention relates in general to the field of the non-contact, optical inspection of parts and, more particularly, to methods and systems for optically inspecting parts, such as ammunition cartridge cases.

OVERVIEW

Traditional manual, gauging devices and techniques have been replaced to some extent by automatic inspection methods and systems. However, many manual gauging devices and techniques are still used despite having a number of shortcomings associated with them. U.S. Pat. Nos. 4,918, 825; 5,570,513 and 6,397,720 disclose such devices and techniques.

Inspection of defects on and in small arms ammunition cartridges and cases is a vital aspect in the manufacturing process, allowing for maintenance of a high level of quality and reliability in the munitions industry. Standards have been developed and applied by manufacturers for many years to assist in classifying various types of defects. Alternatively, a military standard is used such as that introduced in 1958 by the U.S. Department of Defense, MIL-STD-636. For small arms ammunition calibers up to 0.50, this standard serves to evaluate and illustrate a practical majority of defects assembled as a result of extensive surveys covering all the small arms ammunition manufacturing facilities in the United States.

U.S. Pat. No. 4,923,066 discloses an automatic visual inspection system for small arms ammunition which sorts visual surface flaws.

U.S. Pat. No. 7,403,872 discloses a method and system for inspecting manufactured parts such as cartridges and cartridge cases and sorting the inspected parts.

WO 2005/022076 discloses a part inspection apparatus using light line generators.

U.S. Pat. No. 6,313,948 discloses an optical beam shaper for production of a uniform sheet of light for use in a parts inspection system having a light source including a coherent light generator, a diffractive beam shaper, and lens elements.

U.S. Pat. No. 6,285,034 discloses an inspection system for evaluating rotationally asymmetric workpieces for conformance to configuration criteria.

U.S. Pat. No. 6,252,661 discloses an inspection system for evaluating workpieces for conformance to configuration criteria.

U.S. Pat. No. 6,959,108 discloses an inspection system wherein workpieces to be inspected are consecutively and automatically launched to pass unsupported through the field of view of a plurality of cameras.

U.S. Pat. No. 4,831,251 discloses an optical device for discriminating threaded workpiece by the handedness by their screw thread profiles.

U.S. Pat. No. 5,383,021 discloses a non-contact inspection system capable of evaluating spatial form parameters of a workpiece to provide inspection of parts in production.

U.S. Pat. No. 5,568,263 also discloses a non-contact inspection system capable of evaluating spatial form parameters of a workpiece to provide inspection of parts in production.

U.S. Pat. No. 4,852,983 discloses an optical system which simulates the optical effect of traveling over a large distance on light traveling between reference surfaces.

U.S. Patent Application Publication No. 2005/0174567 discloses a system to determine the presence of cracks in parts.

U.S. Patent Application Publication No. 2006/0236792 discloses an inspection station for a workpiece including a conveyor, a mechanism for rotating the workpiece, and a probe.

U.S. Pat. No. 6,289,600 discloses a non-contact measuring device for determining the dimensions of a cylindrical object, such as a pipe.

U.S. Pat. No. 5,521,707 discloses a non-contact laser-based sensor guided by a precision mechanical system which scans a thread form producing a set of digitized images of the thread form.

WO 2009/130062 discloses a method and a device for the optical viewing of objects.

U.S. Pat. No. 4,547,674 discloses a method and apparatus for inspecting gear geometry via optical triangulation.

U.S. Pat. No. 4,970,401 discloses a non-contact triangulation probe system including a base plate and a first non-contact triangulation probe including a light source mounted on a first movable slide.

U.S. Pat. Nos. 5,168,458 and 5,170,306 disclose methods and systems for gauging threaded fasteners to obtain trilobular parameters.

Other U.S. patents documents related to the invention include: U.S. Pat. Nos. 4,315,688; 4,598,998; 4,644,394; 4,852,983; 4,906,098; 5,521,707; 5,608,530; 5,646,724; 5,291,272; 6,055,329; 6,708,071; 4,983,043; 3,924,953; 5,164,995; 4,721,388; 4,969,746; 5,012,117; 7,684,054; 7,403,872; 7,633,635; 7,312,607; 7,565,216; 7,777,900; 7,633,046; 7,633,634; 7,738,121; 7,755,754; 7,738,088; 7,796,278; 7,684,054; and 7,812,970; and U.S. published patent applications 2010/0245850; 2006/0248739; and 2010/0201806.

SUMMARY OF EXAMPLE EMBODIMENTS

In one example embodiment, a method of optically inspecting parts is provided. Each part has a length, a diameter and an axis. The method includes supporting the part and linearly scanning at least one plane of radiation having a width wider than the diameter of the part onto an exterior side surface of the supported part so that the part occludes the at least one plane of radiation at a plurality of spaced apart locations along the axis to create unobstructed left and right planar portions of the at least one plane of radiation passing by and not blocked by the part. The unobstructed left and right planar portions contain an amount of radiation which is representative of a respective diameter of the part at the plurality of spaced apart locations. The method still further includes measuring the amount of radiation present in the unobstructed left and right planar portions during the step of scanning to obtain measurement signals which represent diameter of the part at each of the plurality of spaced apart locations along the axis. The method further includes processing the measurement signals to obtain input data. The method still further includes forming a virtual representation of an outer profile of the part in a reference frame based on the input data. The method further includes providing a virtual representation of an inner bore of a physical gauge in the reference frame. The inner bore has a diameter. The method still further includes determining an interference position between the part and the gauge using the virtual representations. The interference position is a position along the axis where the bore diameter is substantially equal to the part diameter. The method further includes calculating a distance along the axis based on the interference position and storing the distance.

The part may be a cartridge case and the distance may comprise a headspace of the cartridge case.

The method may further include providing an inclined track to support the part. The method may still further include dropping the part onto the inclined track so that the part slides down the track by the force of gravity. The step of scanning may be performed as the part slides down the track. The method may further include determining the velocity of the sliding part, where the step of forming is also based on the velocity.

The method may further include determining whether the headspace is within a range of acceptable headspace values.

The method may further include generating a signal if the headspace is outside the range of acceptable headspace values.

The step of scanning may include the step of relatively linearly moving the at least one plane of radiation with respect to the supported part.

The supported part may be scanned with a plurality of planes of radiation during the step of scanning. Each of the planes of radiation may scan the part from a different azimuthal direction relative to the axis.

The radiation may be laser radiation.

The interference position may be stored in machine readable media which may include non-transitory tangible media or transitory propagating signals.

In another example embodiment, a system for optically inspecting a part having a length, a diameter and an axis is provided. The system includes means for supporting the part. The system further includes means for linearly scanning at least one plane of radiation having a width wider than the diameter of the part onto an exterior side surface of the supported part so that the part occludes the at least one plane of radiation at a plurality of spaced apart locations along the axis to create unobstructed left and right planar portions of the at least one plane of radiation passing by and not blocked by the part. The unobstructed left and right planar portions contain an amount of radiation which is representative of a respective diameter of the part at the plurality of spaced apart locations. The system still further includes means for measuring the amount of radiation present in the unobstructed left and right planar portions during the step of scanning to obtain measurement signals which represent diameter of the part at each of the plurality of spaced apart locations along the axis. The system further includes means for processing the measurement signals to obtain input data. The system still further includes means for forming a virtual representation of an outer profile of the part in a reference frame based on the input data. The system further includes means for providing a virtual representation of an inner bore of a physical gauge in the reference frame. The inner bore has a diameter. The system still further includes means for determining an interference position between the part and the gauge using the virtual representations. The interference position is a position along the axis where the bore diameter is substantially equal to the part diameter. The system further includes means for calculating a distance along the axis based on the interference position and means for storing the distance.

The part may be a cartridge case and the distance may comprise a headspace of the cartridge case.

The means for supporting may include an inclined track for receiving a dropped part so that the part slides down the track by the force of gravity. The scanning may be performed as the part slides down the track. The system may further include means for determining the velocity of the sliding part, where the forming is also based on the velocity.

The system may further include means for determining whether the headspace is within a range of acceptable headspace values.

The system may further include means for generating a signal if the headspace is outside the range of acceptable headspace values.

The means for scanning may include means for relatively linearly moving the at least one plane of radiation with respect to the supported part.

The supported part may be scanned with a plurality of planes of radiation during scanning. Each of the planes of radiation may scan the part from a different azimuthal direction relative to the axis.

The radiation may be laser radiation.

The means for storing may include machine readable media which may include transitory propagating signals or non-transitory tangible media.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is made to the following description taken in conjunction with the accompanying drawings, in which.

DETAILED DESCRIPTION OF EXAMPLE EMBODIMENT

One embodiment of the overall system described in this application is referred to as "LaserLab." LaserLab is a trademark of the assignee of this application.

The LaserLab described in the above-noted commonly owned applications and patents does at least one thing very well: quickly and accurately measure all external characteristics on a manufactured cylindrical part. U.S. Pat. No. 7,796, 278 is hereby incorporated by reference herein. The goal of at least one embodiment of this invention was to find a way to use the information available from the LaserLab to learn something about (i.e. measure) a limited number of specific internal characteristics. While this is not possible directly, a way was devised to allow indirect measurement of the characteristics of interest. The existing sensors on the LaserLab extract more information from the data it is already capable of collecting, and it does this without any significant additional effort on the part of the operator.

LaserLab—Physical Overview

The LaserLab system (i.e. FIG. 1) includes several physical subsystems or units as described in U.S. Pat. No. 7,796, 278.

A PC tower unit (i.e. FIG. 2) contains a computer and a number of additional control electronics modules. It has a rear panel with connectors for light curtain/safety electronics, motor control, linear encoder, measurement signals, and optical head control. The PC tower unit hosts the application program which presents a user interface to an operator of the LaserLab system.

Although at least one embodiment of the present invention was motivated by the needs of the ammunition industry, there are other examples of manufactured parts, such as cylindrical threaded parts or fasteners, which can take advantage of the present invention. As other examples, both the battery canister and aerosol container industries can utilize at least one embodiment of the invention. Throughout the discussions below, it is assumed that the part being measured is round, and the tooling that interfaces with this part are therefore described as being conical. If the part contains a recess with a different shape (hexagonal for example), a tooling set with a different cross-section can be used. The concept of the invention is otherwise unchanged.

Part holder and upper tooling units (FIG. 1) secure or receive and retain a part, such as an ammunition case, in place for measurement. The upper tooling unit typically includes a stainless steel rod with a spring loaded upper holding device that can move up and down to accommodate a wide variety of part sizes. The part holder unit has a base to support a lower holding device and its held part or unit under test and a calibration device. The calibration cone or device is used to measure the relationship between a light sensor output and the physical measurements represented by the outline dimensions of the cone. The calibration cone or device is not strictly speaking a cone but rather includes a number of frustums (i.e., portions of cones) and cylinders.

An optical head (FIG. 1) is a sealed system containing a number of components including optical measurement components. A set of four laser beam lines generate and measure four planes of light.

A slide/base unit (i.e. FIG. 1) moves the optical head vertically up and down to make part and holding device measurements. On every scan the optical head's eight sensors measure shadow images of the calibration cone, the part and the holding devices. Each complete scan thus contains both calibration data and measurement data, yielding a system that is especially unaffected by time variations in measurement conditions.

Figure 1:
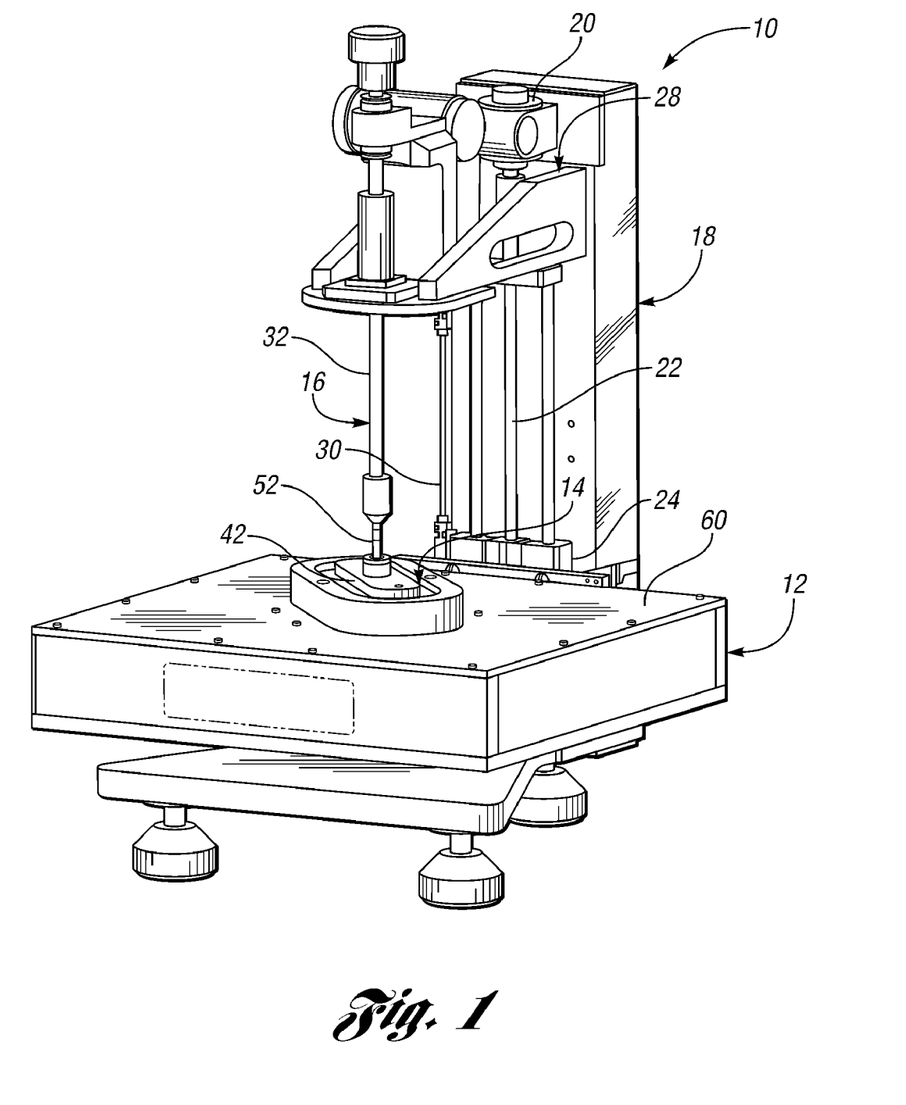
FIG. 1 is a schematic perspective view of a part inspection system constructed in accordance with an embodiment of the present invention.

Referring again to the drawing figures, FIG. 1 is a schematic perspective view of the LaserLab system, generally indicated at 10, including the basic measurement hardware of the system 10. Shown are the optical head, generally indicated at 12, the part holder/upper tooling units, generally indicated at 14 and 16, respectively, and the base/slide unit, generally indicated at 18, which includes a motor 20 coupled to a lead screw 22 which, in turn, is coupled to a saddle 24 slidably supported by a bearing. The saddle 24 is coupled to the optical head 12 to move the optical head 12 linearly along a vertical stage axis 28. Movement of the stage is sensed by a linear encoder 30.

Multiple Beam Optical Head

Figure 2:
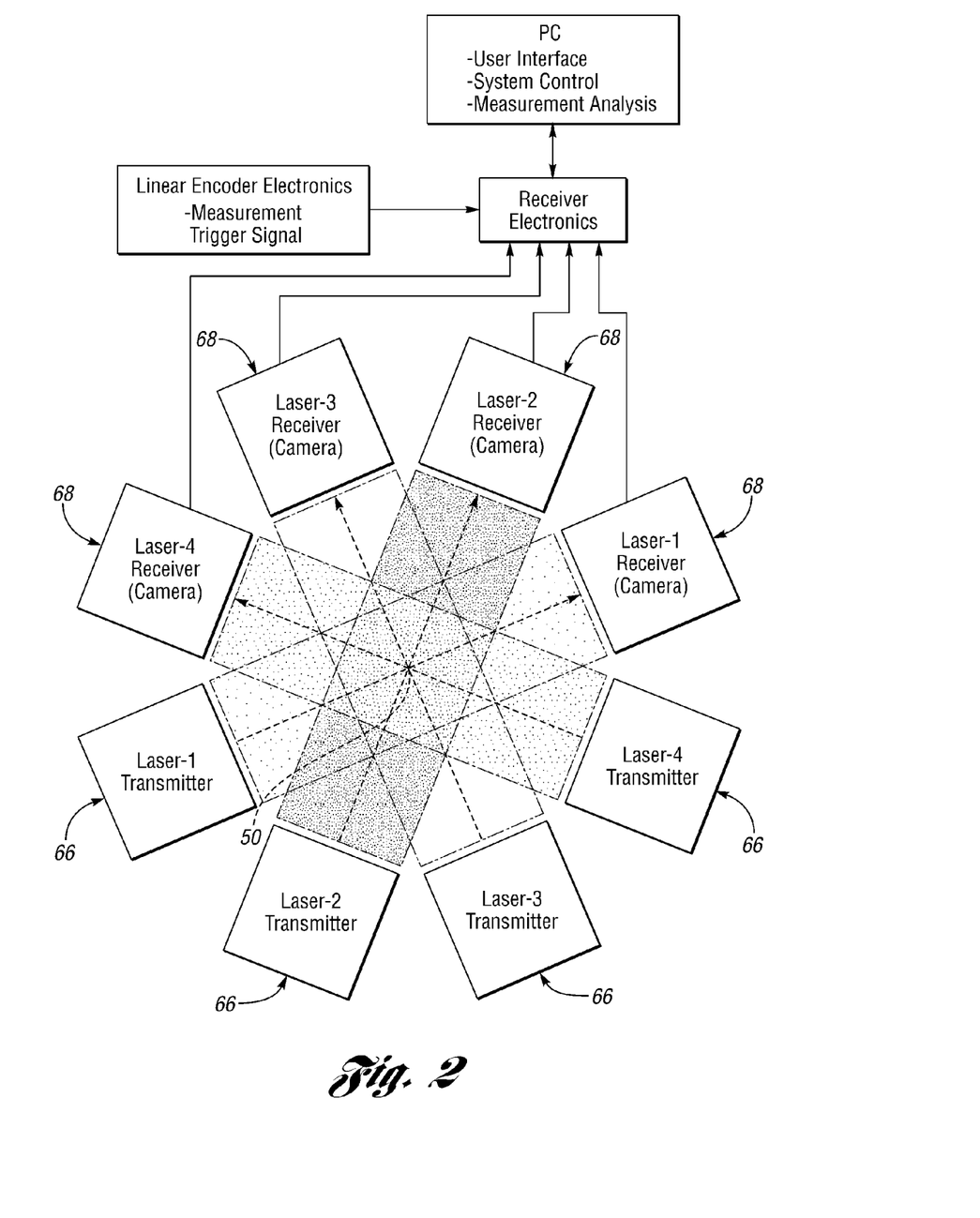
FIG. 2 is a schematic block diagram of various laser light transmitters and corresponding receivers or cameras which can be contained within an optical head of the system of FIG. 1 or which can be stationary with the part moving along a gravity feed track or on a conveyor to provide relative motion between the part and the hardware.

The optical head 12 contains four beam line subsystems. The subsystems are aligned on a common central axis. Looking directly down on the optical head 12 the beam line light plane split lines preferably intersect at a common point 50 of an axis of the part 52 as shown in FIG. 2. The angles of the beam lines, relative to the front of the optical head base plate, are 22.5, 67.5, 112.5, and 157.5 degrees.

This arrangement, combined with the mechanical scanning of the light planes, results in eight outline images of the part 52, one per sensor.

FIG. 2 is a top plan schematic view of laser light transmitters or modules 66 and laser receiver or camera modules 68 of the optical head 12 with its top plate 60 removed. The laser split line for each transmitter module 66 is indicated as a dashed ray which has an arrow head which illustrates the direction of travel of the light beam and the plane of laser light. FIG. 2 also represents an embodiment of the invention where a part, such as the part 52, moves linearly along its axis and the transmitter 66 and the receivers 68 are stationary. As described below, the part 52 may move along a track or may move with a conveyor with the transmitters 66 and the receivers 68 located about the track or conveyor at different azimuthal positions.

Figure 3:
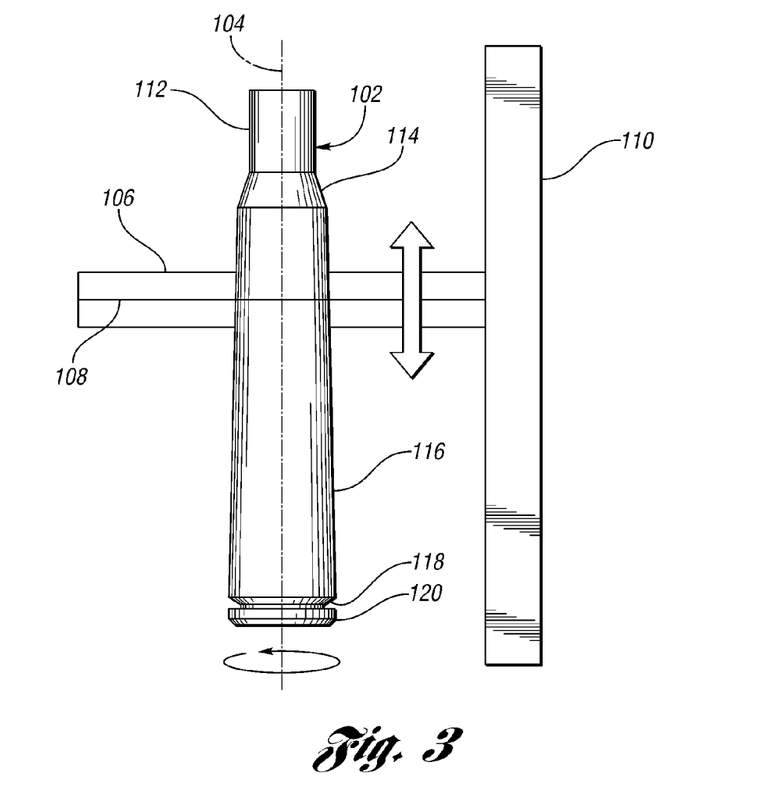
FIG. 3 is a simplified schematic view of a part inspection system constructed in accordance with another embodiment of the present invention wherein the part is rotatable and the part is scanned along its length.

FIG. 3 is a drawing which illustrates a second embodiment of the invention which is described in detail in U.S. Pat. No. 7,684,054 which is also incorporated herein. A part, such as a cartridge case 102 to be inspected, is placed in a rotatable fixture allowing the component to be rotated about axis 104. Behind the case 102 is a bright, horizontally oriented light source 106 and, in front of the case 102 is a horizontally oriented light detector 108. This is a highly simplified drawing, such that details of the light source, detector and other features are not illustrated for the purposes of clarity, or are any of the enclosures that would be used for most of the components.

The cartridge case 102 may include a neck 112, a taper 114, a case portion 116, a groove 118 and a head 120.

The light source 106 and detector 108 are physically coupled to one another, such that they move as a unit up and down along the axis 104 of the part 102. This is accomplished by connecting the light source and detector to a column 110, including a translation mechanism and linear encoder for precise movement. In this embodiment, the light source and detector may move in fixed increments of 1 micron, though this is adjustable.

The light source 106 is of a high intensity, creating a bright field and an image on the detector 108 which is extremely high in contrast. With such an arrangement, the light-sensing elements of the detector 108 essentially see white where the light is able to pass by the part 102, and dark or black where the component blocks the light reaching the detector 108. The elements of the detector 108 are coupled to a processor (not shown) which receives the profile information for each up/down increment of the light source 106 and the detector 108 as they move. The various readings are compiled, providing for an accurate profile of the part 102 at a particular orientation. Once the length of the part 102 is scanned as desired or necessary, the part 102 is rotated about axis 104, and the process is repeated. The angle through which the part 102 is rotated is preferably user controllable, though a total rotation of 180° as opposed to 360° is sufficient, since the detector 108 need not look at the "backside" of the part 102.

According to this embodiment of the invention, the detector 108 may be comprised of a linear set of sensor elements, each element being positioned at a known, fixed distance relative to the overall set. As these dimensions are known, the profile and other characteristics of the part 102, including diameter and other features, may be precisely measured and stored through appropriate calibration. The detector 108 may be implemented utilizing a line-scan camera. Also, the line-scan camera may be simulated using a two-dimensional image sensor.

Since the detector elements of most two-dimensional image sensors are grouped in a plurality of lines, a number of rows of pixels are used during each up/down increment. For example, if 16 lines are coupled to one another in the image sensor, the stage 110 is directed under computer control to move up or down at a distance calibrated to the 16 lines of the sensor. Again, since the distance between rows of pixels on the image sensor is known in advance, it is a straightforward calibration procedure to increment the light source 106 and detector 108 by any given number of rows per increment. Note, further, that the invention is not limited in terms of the length of the part, so long as it fits into the machine and the translator 110 is able to move the light source 106 and detector 108 along the length of the part.

Given the versatility of the system and method, the scanning process may utilize multiple, distinct scanning processes. For example, in addition to the linear scan just described (set angle, variable position along the part axis), a rotational scan may be used with a set linear position and a variable angle. The rotational scan can, for example, be used very efficiently to detect the flat-to-flat or peak-to-peak distance on a hex screw head. This can be used for any local analysis requiring significantly more data than the ones given by the somewhat limited number of planes available through the linear scan. Checking for roundness for instance would require at least 4 planes which the user may not necessarily want for the rest of the inspection. Use of the rotational scan allows for the acquisition of more data to perform a roundness analysis.

These different scan modalities may be used separately, together, and/or repeated as desired. For example, a complete scan process (linear+rotational) may be repeated several times, (i.e. "observations").

The width of the light source 106 may be physically matched to the detector elements 108. This may be done with a light source formed from a linear row of surface-mount high-brightness-emitting diodes, with an overall length on the order of 2 inches. The width of the rows of pixels on the image sensor are also on the order of 2 inches, such that, in essence, a plane of light emerges from the light source 106, past the component 102, and on to the image sensor or detector 108.

A light source 106 in the form of a line of LEDs has advantages and disadvantages. LEDs are relatively inexpensive, compact and easy to implement, but the light is not collimated. This means that the outer edges LEDs can create reflections on the part if it shiny or if it has a succession of flat surfaces such as a hex screw head. This problem may be resolved by implementing a line-generated laser lighting scheme (collimated in nature), but is bulkier and more expensive.

An advantage of the invention is that the component need not be perfectly centered in the inspection plane in order to measure features, such as threads, diameter, and so forth. Since the light source and detector are laterally fixed as they move up or down, the profile of the part may be registered to one end of the detector, measurements being normalized regardless of minor variances. This is an advantage over some prior art systems, which must be placed exactly in the center of a beam in order for multiple detectors to accurately measure component features. This embodiment of the invention not only measures the width of the part in the area of inspection but also its location in the field of view with respect to one end of the detector. Thus, the invention may measure the features on components that would be a challenge to existing systems, including screws of the type called "trilobes." These are self-tapping screws that are not, at all times, perfectly cylindrical. According to the instant invention, however, since measurements are referenced to one end of the detector, accurate details may be determined following a sufficient number of angular displacements. For instance the trilobular feature is only detected by the oscillation of its edges versus the angular displacement, while displaying a constant width.

This embodiment of the invention can also measure exotic parts, having diameters that change dramatically from end to another. Components that are bent and which may include flat surfaces may also be examined. A distinct advantage of the physical measurement process described here is that it directly measures a length (or diameter) but also its horizontal location in the inspection plane. This is particularly important in the case of the trilobular parts since at any given angle the diameters are equal. The only tell-tell sign of its trilobular feature is its horizontal "wobble," which this invention takes into account.

Figure 4:
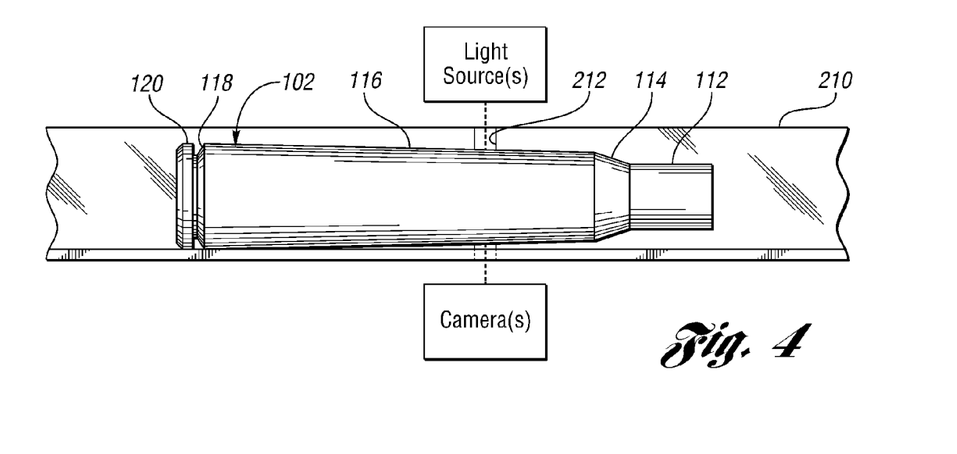
FIG. 4 is a simplified top schematic view of a part inspection system with a part moving down a V-shaped track having a separation to allow one or more planes of radiation or light projected by source(s) to be detected by one or more detectors or cameras positioned on the opposite side of the track so as to scan the part as it moves along the track.

The invention is also applicable to both 100% inspection and sorting operations. Reference is made to FIG. 4 which shows, respectively, the cartridge case 102 moving down a V-shaped track 210 having a separation 212, allowing one or more light sources and one or more detectors or cameras to be positioned to scan the case 102 as it moves along the track 210. The velocity of the component can be measured optically. Although the gap or separation 212 in the track 210 may cause the part to move or vibrate, a continuous track which is light-permeable may be used according to the invention. Alternatively, the case 102 may be positioned on a conveyor (not shown) to move between the light source(s) and their corresponding detector(s) or camera(s).

With this embodiment of the invention it is also possible to perform a virtual 3-wire thread measurement.

Also according to the embodiment of FIG. 3, if sufficient profiles are taken along an adequate number of angular rotations, interpolation or other forms of "morphing" algorithms may be used to estimate component geometry in between the actually measured profiles, thereby allowing a three-dimensional model of the part to be created. With this data, the use of a computer aided design program may be used to view a component from different angles, rotate, flip, magnify and perform other operations on the part seen on a computer screen. Furthermore, the 3D reconstruction of the part can be used to reverse engineer parts. Also the inspected part 3D model can be compared to the 3D design model and geometric and dimensional differences can be highlighted using a color scale proportional to the dimensional difference.

A variety of chucks may be used to hold parts for rotational purposes. Assuming the part is a bolt with a hex head, a lower chuck may include a hex-shaped well into which the head of the bolt fits. Similarly, an upper chuck may be adapted to receive the other end of the part. The component-contacting ends may be spring-loaded, allowing a part to be easily and quickly snapped into position. Even if a user requires custom adapters for particular part geometries, these are easily machined and relatively inexpensive.

With reference to FIG. 5-8, a "full form feature" is now described.

Introduction

"Full form" is generally a feature of software running on a computer such as a PC. It is intended to inspect a part for maximum material, like one would do mechanically by testing whether a cylindrical symmetrical gauge would fit around a part (a go-gauge). In order for this to work, the inside of the gauge should be cylindrical or tapered, so that the inside diameter decreases along the part. The input data, the algorithm that is used to inspect the inputs, and the resulting value are described hereinbelow.

Input Data

Sensor Data

Figure 5:
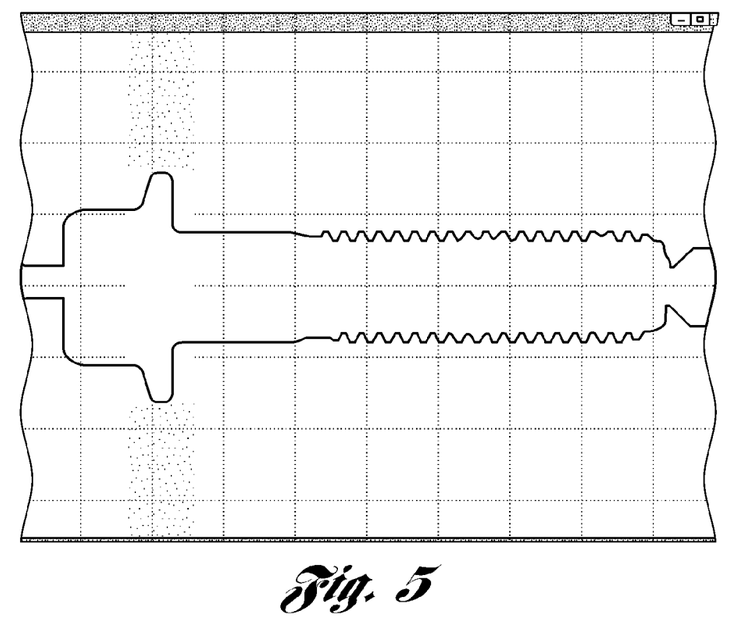
FIG. 5 is a graph formed on a display, partially broken away, and illustrating the outline of a scanned part (here, a threaded fastener); the horizontal axis represents the position along the scan direction; the vertical axis represents measured radius for left and right halves of a sensor (i.e. together a diameter of a part)

As described in each of the embodiments of the invention above, the diameter of a part can be obtained by using a laser projecting a thin sheet of light on the part and measuring the size of the shadow it casts. By sampling the diameter at high speed, and moving the part or the lasers along the axis of the part, an outline of the part can be formed, as shown in FIG. 5 (here a threaded fastener).

To improve accuracy and to measure complex features like threads and hexagonal dimensions, one can use multiple lasers, each providing a view at a different angle to the part as shown in FIG. 2. The laser inspection software therein uses four lasers, with each view separated by 45 degrees. In addition, the sensor that measures diameter is split, so instead of a single diameter it gives a positive and a negative radius.

The result of the sampling is a number (one for each view) of arrays of tuples containing time and the measured radii. The software translates the timing data to position along the part axis by using the velocity and acceleration of the part. In the current configuration, the positions are spaced between 15 and 25 microns. They are not equally spaced since the part is accelerating.

A calibration table is used to translate the acquired radii values to millimeters.

After the pre-processing step, each feature inspection is given a number (one for each view) of arrays of tuples (position-along-axis, left radius, right radius).

Gauge Profile

Figure 6:
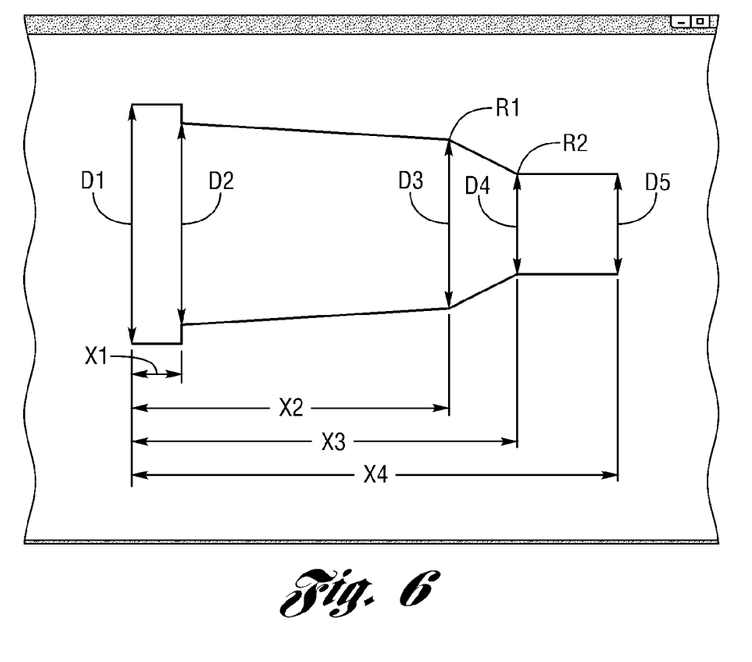
FIG. 6 is a diagram formed on a display, partially broken away, and illustrating a sample virtual gauge which is represented by an array of numerical values (i.e. position, diameter, radius)

By means of a configuration text file, the user can define the shape and dimensions of a virtual gauge as shown in FIG. 6. The shape is expressed as a polygon, where each vertex is described by a position along the part (x1, x2, x3, x4) and the corresponding diameter (D1, D2, D3, D4 and D5). Besides the vertices, the user can also specify a rounding radius (R1, R2) at each point. Since the gauge is to check maximum material condition, radius is either a maximum or minimum value, depending on the direction of the intersection. To the software, the gauge is presented as an array of tuples of (position, diameter, radius).

Algorithm

For each of the views about the parts, the processing of the input array of (position, radii) data is as follows:

Rotation

In the view the part can look slightly rotated. Since the part is measured vertically, the rotation will cause the diameter values to appear larger than reality and the positions to look closer together. The total length of the part will increase with rotation. Elementary trigonometry shows that the factor from measured to real diameter is the cosine of the rotation angle; for positions it is the reciprocal of it.

To measure the rotation angle, the array of data is sliced to a user specified measurement interval. This interval should be cylinder or cone shaped. For each point in the array, the radius from the left sensor and right sensor are subtracted and divided by two to find the centerpoint. Then, a line is fit through this set of points using least sum of squared errors method. The (arc-tangent) of the slope of the line is the rotation angle.

Diameter

For each point in the array of (position, left radius, right radius), the two radii are added and multiplied with a factor mentioned above to correct for rotation. Subsequently, the diameter data is filtered with a moving average filter to smooth out the line and make the measurement more robust and precise. The position of the entries in the array is divided by the compensation factor. The result is an array of (position, diameter) values.

Figure 7:
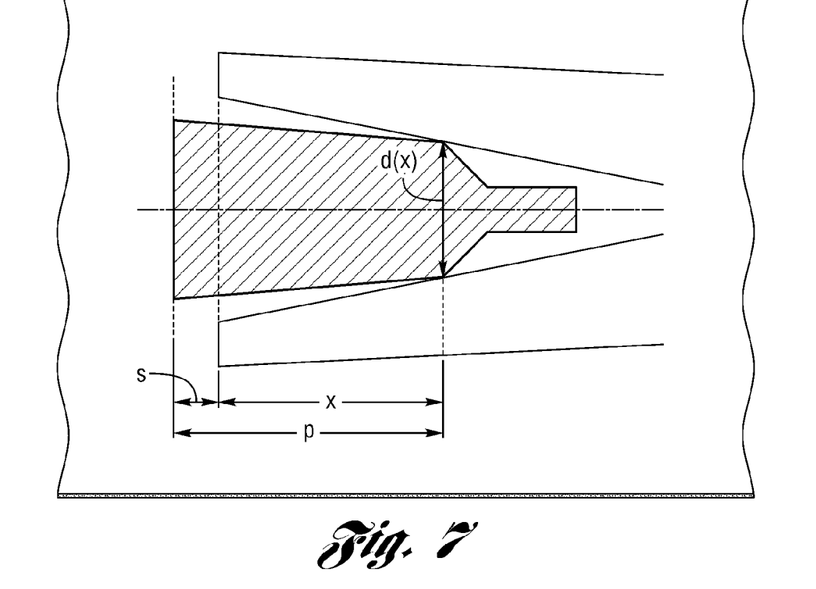
FIG. 7 is a schematic view of a part in cross-section formed on a display, partially broken away, and about which a virtual gauge is fitted; the difference between the positions or lengths x and p along the part axis is a gauge shift, s.

Referring now to FIG. 7, for each point in the array the diameter is translated to the minimum location the gauge can have to accommodate this diameter. The difference between the position on the part and this location is the amount the left side of the gauge needs to shift with respect to the left side of the part. This results in an array of minimum shifts necessary. The final result for this view is obtained by calculating the maximum of this array. This shift, s, is the minimum necessary so that the part and gauge will touch in exactly one point.

Result

Figure 8:
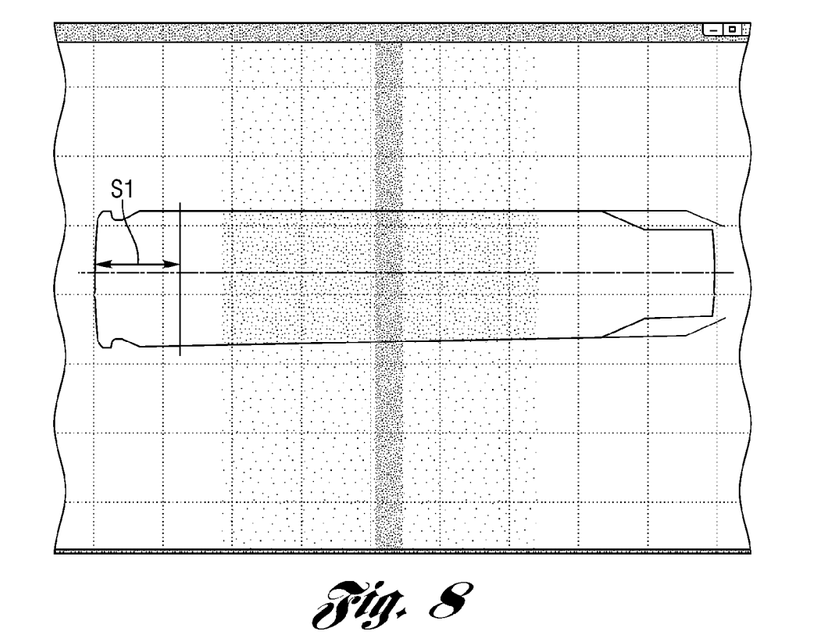
FIG. 8 is a graph formed on a display, partially broken away, and illustrating the outline of a cartridge case and the inner bore of a virtual gauge; the heavier vertical band represents a range of acceptable head space values where a center vertical line of the band is an interference position between the case and the gauge; the case extends from the gauge a measured amount, 51.

The result is a single value, S1, that indicates the distance from the start of the part to the start of the gauge, as shown in FIG. 8. When there are multiple views of the part, the result is the maximum of all views.

If the distance is positive, then the value, S1, is the amount the part extends from the gauge. If the result is negative, then the value, S1, is the distance the part is inserted into the gauge. A small positive value is possible when the gauge actually fits, since the measured length of the part may be larger due to its rotation with respect to the scan-axis.

As with every feature the user can set a minimum and/or maximum tolerance. If the measured value is outside of the tolerance range (i.e. the vertical band in FIG. 8), the feature result is reported, such as by a signal, as failed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for optically inspecting a part having a length, a diameter and an axis, the method comprising:
   supporting the part;
   linearly scanning at least one plane of radiation having a width wider than the diameter of the part onto an exterior side surface of the supported part so that the part occludes the at least one plane of radiation at a plurality of spaced apart locations along the axis to create unobstructed left and right planar portions of the at least one plane of radiation passing by and not blocked by the part wherein the unobstructed left and right planar portions contain an amount of radiation which is representative of a respective diameter of the part at the plurality of spaced apart locations;

measuring the amount of radiation present in the unobstructed left and right planar portions during the step of scanning to obtain measurement signals which represent diameter of the part at each of the plurality of spaced apart locations along the axis;

processing the measurement signals to obtain input data;

forming a virtual representation of an outer profile of the part in a reference frame based on the input data;

providing a virtual representation of an inner bore of a physical gauge in the reference frame, the inner bore having a diameter;

determining an interference position between the part and the gauge using the virtual representations wherein the interference position is a position along the axis where the bore diameter is substantially equal to the part diameter;

calculating a distance along the axis based on the interference position; and storing the distance.

2. The method as claimed in claim 1 wherein the part is a cartridge case and wherein the distance comprises a headspace of the cartridge case.

3. The method as claimed in claim 1 further comprising:
providing an inclined track to support the part;
dropping the part onto the inclined track so that the part slides down the track by the force of gravity, wherein the step of scanning is performed as the part slides down the track; and
determining the velocity of the sliding part, wherein the step of forming is also based on the velocity.

4. The method as claimed in claim 2 further comprising determining whether the headspace is within a range of acceptable headspace values.

5. The method as claimed in claim 4 further comprising generating a signal if the headspace is outside the range of acceptable headspace values.

6. The method as claimed in claim 1 wherein the step of scanning includes the step of relatively linearly moving the at least one plane of radiation with respect to the supported part.

7. The method as claimed in claim 1 wherein the supported part is scanned with a plurality of planes of radiation during the step of scanning and wherein the each of the planes of radiation scans the part from a different azimuthal direction relative to the axis.

8. The method as claimed in claim 1 wherein the radiation is laser radiation.

9. The method as claimed in claim 1 wherein the interference position is stored in machine readable media.

10. The method as claimed in claim 9 wherein the machine readable media includes non-transitory tangible media.

11. The method as claimed in claim 9 wherein the machine readable media includes transitory propagating signals.

12. A system for optically inspecting a part having a length, a diameter and an axis, the system comprising:
means for supporting the part;
means for linearly scanning at least one plane of radiation having a width wider than the diameter of the part onto an exterior side surface of the supported part so that the part occludes the at least one plane of radiation at a plurality of spaced apart locations along the axis to create unobstructed left and right planar portions of the at least one plane of radiation passing by and not blocked by the part wherein the unobstructed left and right planar portions contain an amount of radiation which is representative of a respective diameter of the part at the plurality of spaced apart locations;

means for measuring the amount of radiation present in the unobstructed left and right planar portions during the step of scanning to obtain measurement signals which represent diameter of the part at each of the plurality of spaced apart locations along the axis;

means for processing the measurement signals to obtain input data;

means for forming a virtual representation of an outer profile of the part in a reference frame based on the input data;

means for providing a virtual representation of an inner bore of a physical gauge in the reference frame, the inner bore having a diameter;

means for determining an interference position between the part and the gauge using the virtual representations wherein the interference position is a position along the axis where the bore diameter is substantially equal to the part diameter;

means for calculating a distance along the axis based on the interference position; and means for storing the distance.

13. The system as claimed in claim 12 wherein the part is a cartridge case and wherein the distance comprises a headspace of the cartridge case.

14. The system as claimed in claim 12 wherein the means for supporting includes an inclined track for receiving a dropped part so that the part slides down the track by the force of gravity, wherein the scanning is performed as the part slides down the track; and wherein the system further comprises means for determining the velocity of the sliding part, wherein the forming is also based on the velocity.

15. The system as claimed in claim 13 further comprising means for determining whether the headspace is within a range of acceptable headspace values.

16. The system as claimed in claim 15 further comprising means for generating a signal if the headspace is outside the range of acceptable headspace values.

17. The system as claimed in claim 12 wherein the means for scanning includes means for relatively linearly moving the at least one plane of radiation with respect to the supported part.

18. The system as claimed in claim 12 wherein the supported part is scanned with a plurality of planes of radiation during scanning and wherein the each of the planes of radiation scans the part from a different azimuthal direction relative to the axis.

19. The system as claimed in claim 12 wherein the radiation is laser radiation.

20. The system as claimed in claim 12 wherein the means for storing includes machine readable media.

21. The system as claimed in claim 20 wherein the machine readable media includes non-transitory tangible media.

22. The system as claimed in claim 20 wherein the machine readable media includes transitory propagating signals.

* * * * *